(12) United States Patent
Böhme et al.

(10) Patent No.: US 11,071,960 B2
(45) Date of Patent: Jul. 27, 2021

(54) REACTION CONTAINER

(71) Applicant: INNOIL AG, Untervaz (CH)

(72) Inventors: Kurt Böhme, Vaz/Obervaz (CH); Pierre Freymond, Zug (CH)

(73) Assignee: INNOIL AG, Untervaz (CH)

( * ) Notice: Subject to any disclaimer, the term of this patent is extended or adjusted under 35 U.S.C. 154(b) by 0 days.

(21) Appl. No.: 16/603,911

(22) PCT Filed: Apr. 11, 2018

(86) PCT No.: PCT/EP2018/059336
§ 371 (c)(1),
(2) Date: Oct. 9, 2019

(87) PCT Pub. No.: WO2018/189267
PCT Pub. Date: Oct. 18, 2018

(65) Prior Publication Data
US 2020/0078756 A1   Mar. 12, 2020

(30) Foreign Application Priority Data
Apr. 11, 2017   (DE) .................. 10 2017 107 758.8

(51) Int. Cl.
*B01J 8/10* (2006.01)
*B01J 8/08* (2006.01)
*B01J 19/00* (2006.01)

(52) U.S. Cl.
CPC ................ *B01J 8/10* (2013.01); *B01J 8/082* (2013.01); *B01J 8/087* (2013.01); *B01J 19/0013* (2013.01);
(Continued)

(58) Field of Classification Search
CPC ..... B01J 8/08; B01J 8/082; B01J 8/087; B01J 8/10; B01J 19/00; B01J 19/0013;
(Continued)

(56) References Cited

U.S. PATENT DOCUMENTS 3,089,843 A    5/1963  Du Bois Eastman et al.
7,473,348 B2 *  1/2009  Koch ...................... C10G 1/08
                                                         208/113
(Continued)

FOREIGN PATENT DOCUMENTS

CN      202 149 474 U       2/2012
DE      10 2008 003209 B3   6/2009
(Continued)

OTHER PUBLICATIONS

International Search Report issued by the European Patent Office in International Application PCT/EP2018/059336.
(Continued)

*Primary Examiner* — Jonathan Miller
(74) *Attorney, Agent, or Firm* — Ursula B. Day, Esq.

(57) ABSTRACT

The invention relates to a reaction container for stabilizing the temperature of a liquid mixture substances, the reaction container comprising an upper container part and a lower container part, in which the lower container part has an inner direct means of refrigeration and an outer indirect means of refrigeration in addition to an inner, direct means of heating and an outer, indirect means of heating.

10 Claims, 1 Drawing Sheet

(52) U.S. Cl.
CPC .... *B01J 19/0053* (2013.01); *B01J 2208/0061* (2013.01); *B01J 2208/00132* (2013.01); *B01J 2208/00176* (2013.01); *B01J 2208/00212* (2013.01); *B01J 2208/00539* (2013.01)

(58) Field of Classification Search
CPC .......... B01J 19/0053; B01J 2208/00132; B01J 2208/00176; B01J 2208/00212; B01J 2208/00539; B01J 2208/0061; C10G 1/08; C10G 1/10
See application file for complete search history.

(56) References Cited

U.S. PATENT DOCUMENTS

| | | | | |
|---|---|---|---|---|
| 8,728,416 | B2* | 5/2014 | Buchert | C02F 11/10 422/620 |
| 9,371,492 | B2* | 6/2016 | Spitzauer | B01J 19/2415 |
| 10,252,238 | B2* | 4/2019 | Bayer | C08F 120/06 |
| 2005/0115871 | A1* | 6/2005 | Koch | C10G 1/08 208/113 |
| 2007/0131585 | A1 | 6/2007 | Koch | |
| 2010/0270209 | A1* | 10/2010 | Tschirner | C10G 1/083 208/100 |
| 2015/0047962 | A1* | 2/2015 | Trautmann | B01J 8/087 201/19 |
| 2018/0065102 | A1* | 3/2018 | Bayer | B01J 4/001 |

FOREIGN PATENT DOCUMENTS

| | | |
|---|---|---|
| DE | 10 2012 010 763 A1 | 9/2013 |
| EP | 1 538 191 A1 | 6/2005 |
| JP | H08 206632 A1 | 8/1996 |
| RU | 2 360 946 C2 | 10/2002 |
| RU | 2 470 863 C2 | 10/2012 |
| WO | WO 2009/066251 A1 | 5/2009 |
| WO | WO 2016/116484 A1 | 7/2016 |

OTHER PUBLICATIONS

Russian Search Report dated Dec. 23, 2020 with respect to counterpart Russian patent application 2019133335/05(065847).
Translation of Russian Search Report dated Dec. 23, 2020 with respect to counterpart Russian patent application 2019133335/05(065847).

* cited by examiner

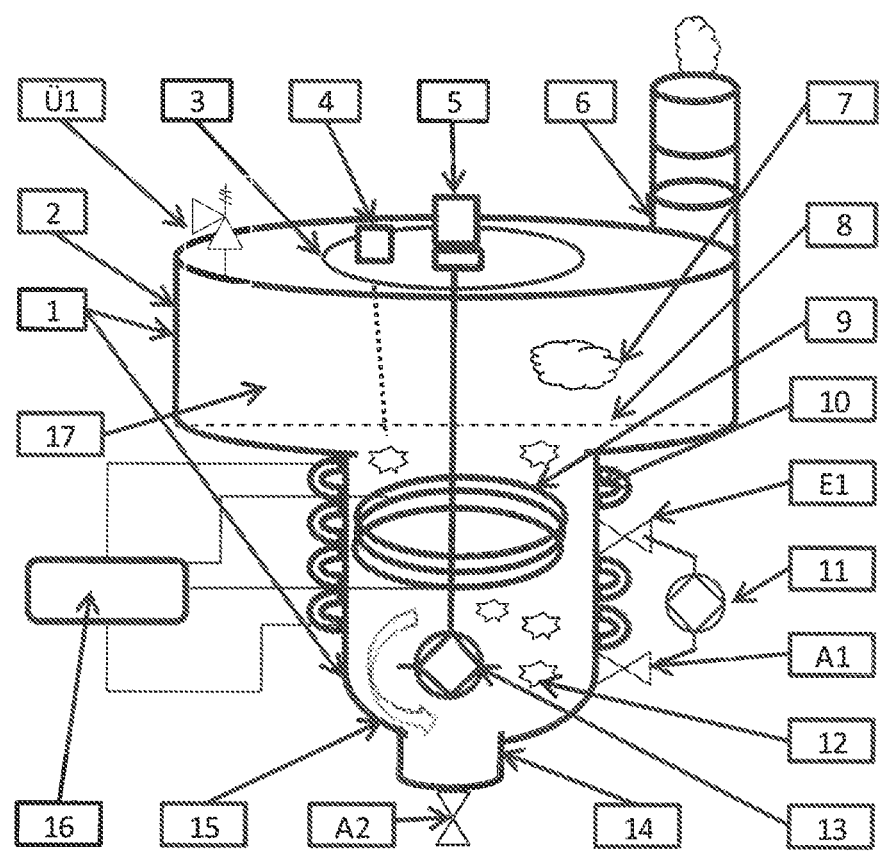

REACTION CONTAINER

CROSS-REFERENCES TO RELATED APPLICATIONS

This application is the U.S. National Stage of International Application No. PCT/EP2018/059336, filed Apr. 11, 2018, which designated the United States and has been published as International Publication No. WO 2018/189267 A1 and which claims the priority of German Patent Application, Serial No. DE 10 2017 107 758.8, filed Apr. 11, 2017, pursuant to 35 U.S.C. 119(a)-(d) the description of which is hereby incorporated by reference.

BACKGROUND OF THE INVENTION

The present invention relates to a reaction container comprising a container top and a container bottom, as well as a method for temperature stabilization of a liquid mixture and a use of the reaction container.

In the direct liquefaction of hydrocarbonaceous wastes and other liquids for the production of middle distillate, various processes have been developed according to the prior art. None of these methods have sufficient thermal management for temperature stabilization of the liquid mixture. This is one reason why none of these plants can industrially produce middle distillates.

From thermodynamics it is known that the conductivity, the amount to be processed and the temperature of a substance that mixes with another substance and at a different temperature, or the contact surfaces at which the energy exchange should take place, decide how well or poorly, how fast or slow the heat exchange takes place and the system works to bring the mixture to a desired temperature and/or to retain the temperature.

WO 2016/116484 A1 describes a device for the catalytic pressureless depolymerization, which has an integrated active cooling and active heating. This thermal management can be considered very efficient, but still presents several disadvantages.

In the catalytic pressure-free treatment by depolymerization artificial or natural polymers and long-chain hydrocarbons with the addition of a catalyst, without excess pressure, converted at temperatures below 400° C. in short-chain, aliphatic hydrocarbons. The combustible hydrocarbons thus obtained can be used as fuel.

SUMMARY OF THE INVENTION

It is an aspect of the present invention to keep the temperature of a liquid mixture in a reaction, which is constantly subject to high temperature fluctuations, for example, the direct liquefaction process for the production of middle distillate from biogenic residues and other hydrocarbon-containing waste products, constant.

This aspect of the present invention is achieved by a reaction container of the afore-stated type, in which the container base has an internal, direct cooling and an external, indirect cooling and an internal, direct heating and an external, indirect heating.

Due to the internal cooling or the internal heating, the liquid mixture located in the reaction container is directly cooled or heated.

The liquid composition may be a mixture of a variety of substances, such as biogenic residues and other hydrocarbon waste products, such as in the direct liquefaction process for middle distillate production.

Suitably, the reaction container is a two-part, insulated container (or a separator) which has a relatively small volume in the container bottom.

The inner cooling and the inner heating as well as the outer cooling and the outer heating are preferably coupled to a thermal management system. The thermal management system ensures that the temperature of the liquid mixture in the reaction container maintains a constant temperature.

The thermal management system preferably comprises a thermal oil heater. Furthermore, the thermal management system includes various pumps, pipelines, thermostats, regulators and refrigeration units as well as a controller with which the reaction container/separator can be cooled or heated.

In the case of internal cooling/heating, a cooling or a heated thermal oil is pumped through a pipe system arranged in the container lower part, the raw system for heat transfer being in direct contact with the liquid mixture of substances.

In the case of external cooling/heating, a cooling or heated thermal oil Is pumped through a pipe system arranged on the outside of the container lower part, wherein the pipe system is in contact with the reactor wall for heat transfer and thus indirectly cools or heats the liquid mixture. For this purpose, the reactor wall, at least in the area where it is in contact with the outer cooling/heating, consists of a heat-conducting material, such as metal.

In addition, redundantly equipped measuring points for temperature, pressure and level are arranged on and/or in the reactor container. A control unit acquires the measured values, evaluates them and regulates them. This ensures that the level, pressure and temperature in the reactor container are kept constant regardless of the Input material, as only if these factors are perfectly matched can a continuous production of middle distillate be achieved.

The control/regulating unit can be integrated in the thermal management system or designed as a separate unit.

The container upper part is preferably designed to be larger than the container lower part. The reaction container suitably has a large expansion volume in the upper container part, as well as a much larger evaporation surface in relation to the lower container part. This makes it possible under atmospheric conditions and under low negative pressure to produce large amounts of steam, collect and distill. Suitably, the evaporation surface of the container upper part is designed to be larger than the base surface of the container lower part.

At the container top one or more distillation columns are preferably arranged.

At the container upper part, a pressure relief valve is preferably arranged.

At the container lower part preferably a heavy particle collector is arranged. The heavy particle collector is suitable for separating heavy metals or larger parts that have erroneously entered the reaction container. For this purpose, the heavy particle collector comprises an outlet or an emergency outlet through which unwanted parts can flow out of the reactor container or are pumped out. In the container interior, a submersible pump and/or an agitator is preferably arranged through which the liquid mixture is moved, crushed and mixed.

The reaction container may contain various heat sources (e.g. as infrared, microwave, etc.), which are arranged in or outside the reaction container and heat the liquid mixture. Furthermore, the object of the present invention is achieved by using the reaction container according to the invention in a device for the catalytic pressureless depolymerization of carbonaceous input material, as described, for example, in WO 20161116484 A1. In a device for catalytic pressureless oiling, the reaction container can be used as a separator.

Furthermore, the object of the present invention is achieved by a method for temperature stabilization of a liquid mixture in a reaction container in which a liquid mixture is introduced into the reaction container and by an internal cooling or an internal heating and an external cooling or an external heating and a thereto connected thermal management system is kept at a constant temperature.

The internal cooling and the internal heating as well as the external cooling and the external heating are preferably controlled and controlled automatically by means of a thermal management system comprising a thermal oil heater, one or more coolers, various pumps, one or more valves.

Further details, features and advantages of embodiments of the invention will become apparent from the following description of an exemplary embodiment with reference to the accompanying FIG. 1 as follows:

DETAILED DESCRIPTION OF PREFERRED EMBODIMENTS

FIG. 1 shows a two-part, closed reaction container/separator 1 which has a distillation column 6 in the upper part of the container 2 and an inner cooling 9 and an outer cooling 10 in the lower part of the container 15, a submersible pump 13 or a dry outer pump 11 outside the reaction container 1, as well as various fillings- and removal points for a liquid mixture 12, which is comminuted by the pump 11 or 13 or both, mixed, triturated and thereby heated. The pump drive 5, for the submersible pump 13 and the level, pressure and temperature control 4 are arranged gas-tight on a screw-cap 3.

Thus, the temperature in the mixture 12, especially in the production of middle distillate from biogenic residues and other hydrocarbon-containing waste products, not constantly subject to severe temperature fluctuations, the closed, two-part reaction container 1, a much smaller container base 15, compared to the container shell 2, and a large evaporation surface 8 and a large evaporation room 17. The container lower part 15 is provided with an outer cooling 10 and an inner cooling 9, a heavy parts collector 14 and an emergency discharge A2.

The advantage of this invention is that the container base 15 only has to be slightly overfilled in order to increase the evaporation surface 8 in the container top 2 and at the same time a much smaller volume of liquid mixture 12 through the submersible pump 13 and/or an agitator or by the outer pump 11, or through both pumps 11 and 13, or the outer pump 11 and a stirrer must be moved to keep the temperature constant over the thermal management system 16 and the inner cooling 9 and outer cooling 10.

The reaction container 1, which can also be used as a separator at the same time, has a large evaporation surface 8 and a large volume in the container upper part 2 and a significantly smaller volume in the container lower part 15, in which a liquid substance mixture 12 is circulated by an inserted submersible pump 13.

The container base 15 has an inner (direct) and an outer (indirect) cooling/heating and a heavy particle container 14 (or a heavy particle collector).

The reaction container 1 makes it possible to keep the temperature and pressure of a very small amount of a liquid mixture 12 constant in the direct liquefaction of hydrocarbonaceous residues for the production of middle distillate. By using a special submersible pump in the container base 15, which is suitable for crushing and heating and is arranged gas-tight on a lid 3 in the container upper part 2, the process can be additionally optimized.

With the integrated internal (direct) cooling/heating 9 and external (indirect) cooling/heating 10 in the container base 15 and the thermal management system 16 connected thereto, the very small amount of liquid mixture 12 can always be maintained at a constant temperature.

The liquid substance mixture 12 is pumped with an (external) pump 11 through a substance mixture inlet E1 into the reaction container 1 and can be pumped out of the reaction container 1 again through a substance geniculate outlet A1.

The forming during operation of the reaction container 1 In the container upper part 2 steam 7 can be discharged through a pressure relief valve Ü1, which is arranged on the container upper part 2.

What is claimed is:

1. A reaction container comprising,
   a container upper part and a container bottom part, the container upper part being larger as compared to the container bottom part and provided with a large evaporation room having a large evaporation surface, said container bottom part provided with an internal unit for internal, direct cooling and heating and an external unit for external, indirect cooling and heating, wherein the unit for internal cooling and heating and the unit for external cooling and heating are coupled to a thermal management system that includes a controller to stabilize the temperature of a liquid substance mixture residing in the container.

2. The reaction container according to claim 1, wherein the thermal management system comprises a thermal oil heater.

3. The reaction container according to claim 2, further comprising one or more distillation columns arranged on the container upper part.

4. The reaction container according to claim 3, wherein a pressure relief valve is arranged on the container upper part.

5. The reaction container according to claim 3, wherein a heavy particle collector is arranged on the container lower part.

6. The reaction container according to claim 1, further comprising a submersible pump and/or an agitator arranged in the container interior.

7. The container of claim 1, wherein the evaporation surface of the container upper part is larger than a floor surface of the container bottom part.

8. A method of using the reaction vessel according to claim 1 comprising, carrying out a catalytic pressureless depolymerization of carbonaceous input material.

9. A method to temperature-stabilize a liquid substance mixture in the reaction container of claim 1 comprising,
   keeping the liquid substance mixture at a constant temperature by the internal cooling or the internal heating and the outer cooling or the outer heating, and regulating the cooling and the heating with the thermal management system.

10. The method according to claim 9, wherein the thermal management system comprises a thermal oil heater, one or multiple coolers, pumps, one or more valves, and
   controlling the heating and cooling in a fully automated and controlled manner.

* * * * *